(12) United States Patent
Eom (10) Patent No.: US 9,386,059 B2
(45) Date of Patent: Jul. 5, 2016

(54) APPARATUS AND METHOD FOR PROVIDING TIME SHIFT FUNCTION IN CLOUD COMPUTING SYSTEM

(71) Applicant: SAMSUNG ELECTRONICS CO., LTD., Suwon-si (KR)

(72) Inventor: Myung-jin Eom, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 496 days.

(21) Appl. No.: 13/890,467

(22) Filed: May 9, 2013

(65) Prior Publication Data

US 2013/0346561 A1 Dec. 26, 2013

(30) Foreign Application Priority Data

Jun. 20, 2012 (KR) ........................ 10-2012-0066319

(51) Int. Cl.
*G06F 15/16* (2006.01)
*H04L 29/06* (2006.01)
*H04L 29/08* (2006.01)

(52) U.S. Cl.
CPC ............... *H04L 65/60* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,081,278 A * | 6/2000 | Chen | ...................... | G06T 17/00 345/473 |
| 2004/0039788 A1* | 2/2004 | Lim | ..................... | H04L 12/1886 709/214 |
| 2006/0272012 A1* | 11/2006 | Wu | ..................... | H04L 41/0896 726/6 |
| 2008/0134091 A1* | 6/2008 | Kim | .................. | G06F 17/30029 715/825 |
| 2008/0215722 A1* | 9/2008 | Hogaboom | ......... | H04L 12/2602 709/224 |
| 2010/0005136 A1* | 1/2010 | Ferlitsch | ........... | G06F 17/30876 709/203 |
| 2011/0238761 A1* | 9/2011 | Mizokami | ........... | H04L 12/1827 709/206 |
| 2012/0040719 A1* | 2/2012 | Lee | ....................... | G06F 1/1626 455/557 |
| 2012/0158883 A1* | 6/2012 | Ikenaga | .................... | G06F 9/06 709/213 |
| 2012/0293826 A1* | 11/2012 | Saurabh | ................ | G06F 3/1206 358/1.15 |
| 2012/0320032 A1* | 12/2012 | Zhu | ......................... | G06T 17/00 345/419 |
| 2013/0258042 A1* | 10/2013 | Shun | ...................... | H04L 67/22 348/14.08 |

* cited by examiner

Primary Examiner — Brian P Whipple
(74) Attorney, Agent, or Firm — Sughrue Mion, PLLC (57) ABSTRACT

Provided are a cloud server, a client terminal, and a method for providing a time shift operation in a cloud computing system. The cloud server includes: a receiver which receives control information from the client terminal; and a controller which generates image information based on the received control information, wherein the generated image information is converted to an image data file, the image data file is stored in a storage space for the cloud server, according to a pre-set criterion, and is transmitted to the client terminal. Accordingly, a user of the client terminal may view a screen that was viewed in the past.

21 Claims, 7 Drawing Sheets

APPARATUS AND METHOD FOR PROVIDING TIME SHIFT FUNCTION IN CLOUD COMPUTING SYSTEM

CROSS-REFERENCE TO RELATED PATENT APPLICATION

This application claims priority from Korean Patent Application No. 10-2012-066319, filed on Jun. 20, 2012 in the Korean Intellectual Property Office, the disclosure of which is incorporated herein in its entirety by reference.

BACKGROUND

1. Field

Apparatuses and methods consistent with exemplary embodiments relate to providing a time shift function in a cloud computing system and, more particularly, to allowing a user of a client terminal to view past screen information and past contents by storing an image displayed on a screen of the client terminal, in a cloud server.

2. Description of the Related Art

Cloud computing indicates Internet-based or network-based computing technology. A user may use the cloud computing by establishing a program infrastructure in a data server in a network and executing a program for a terminal such as a personal computer (PC) or a mobile phone. Here, the cloud indicates a complicated and hidden infrastructure. The user may use the cloud computing even without knowing this complicated infrastructure.

Figure 1:
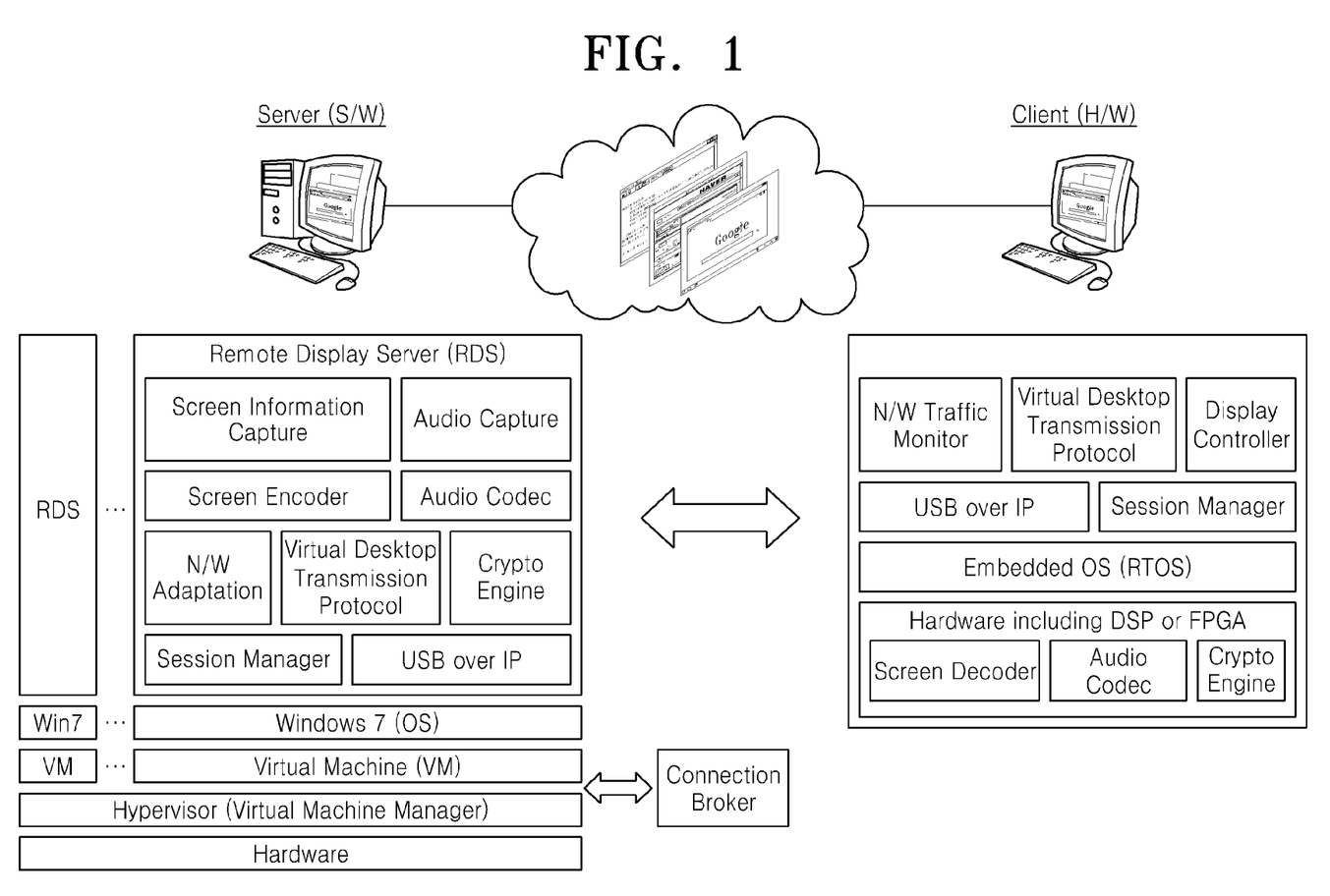
FIG. 1 is a block diagram of a cloud computing system.

FIG. 1 is a block diagram of a cloud computing system. In the present disclosure, "cloud server" indicates a server for providing software in cloud computing, and "client terminal" indicates a device for providing hardware for displaying a result that is processed using software in the cloud server. That is, the client terminal may include a display and a least number of components for processing a user input. In other words, the client terminal need not include a separate storage device for storing data or programs. Of course, some types of client terminals included in the cloud computing system may include a data storage device. For example, a client terminal, such as a cloud monitor, for only sending a user input to the cloud server and displaying a result of processing the user input may not include a data storage device. However, devices, such as smart phones and tablet PCs, may include a data storage device. Of course, it is understood that exemplary embodiments are not limited thereto.

Referring to FIG. 1, when the client terminal sends a control signal to the cloud server, the cloud server processes the control signal. For example, when the client terminal sends a control signal for executing a specific program to the cloud server, the cloud server executes the specific program and sends a processing result to the client terminal, wherein the processing result indicates image information to be displayed on the client terminal.

Compared to a general personal computing service, in a personal computing device, such as a PC or laptop computer, when a user inputs a control signal using an input device such as a keyboard or a mouse, a central processing unit (CPU) processes the control signal and outputs a processing result to a display device such as a monitor. However, in the cloud computing system, a control signal input into the client terminal is processed by the cloud server, and the cloud server converts a result of the control signal being processed into image information and sends the image information to the client terminal. The client terminal displays the received image information on a display device of the client terminal.

The cloud server may efficiently utilize system resources by allocating a corresponding virtual machine to the client terminal. In addition, to reduce a load on a network when the cloud server sends the image information, the cloud server may capture the image information generated in response to the control signal and send image information generated using a screen encoder to the client terminal. In this case, the client terminal may parse the image information using a screen decoder included in the client terminal and display the parsed image information on a screen.

However, in a cloud computing system, since a client terminal includes only components for displaying a processing result based on a user input, a user cannot view a screen with which the user interacted in the past (this occurs in general personal computing devices as well). Although the user may restore the client terminal to a specific past time or restore a specific data file through a system or device backup, the user cannot view a past screen itself.

SUMMARY

Accordingly, one or more exemplary embodiments provide a cloud server for storing image information and providing the stored image information to a client terminal.

According to an aspect of an exemplary embodiment, there is provided a cloud server for providing image information to a client terminal, the cloud server including: a receiver which receives control information from the client terminal; and a controller which generates image information based on the received control information, wherein the generated image information is converted to an image data file and the image data file is stored in a storage space for the cloud server, according to a pre-set criterion.

The cloud server may further include a transmitter which transmits the generated image information to the client terminal, wherein the transmitted image information is displayed on a screen of the client terminal or connected to the client terminal.

The controller may convert image information, in which a change is detected from among the generated image information, into the image data file.

The receiver may receive inputs for instructing a start to storing and an end to storing of the image information from the client terminal, and the controller may store the image information as the image data file based on the received inputs.

The image data file may change at least one of a resolution, a size, and an image quality of an image included in the generated image information.

The transmitted image data file may be displayed on a screen of the client terminal or connected to the client terminal, on which the transmitted image information is displayed, by using a Picture in Picture (PIP) method or an On Screen Display (OSD) method, or the transmitted image information may be displayed on a first screen of the client terminal or connected to the client terminal while the transmitted image data file is displayed on a second screen of the client terminal or connected to the client terminal.

The receiver may receive screen control information related to the image data file from the client terminal, and the controller may change a display of the image data file in response to the received screen control information.

The controller may pause a task for storing the generated image information as the image data file when the screen control information is received.

When an editing file is stored by a program executed by the cloud server, the controller may link the generated image information and the file stored by the program and store the linked image information and file as the image data file.

The image data file may include link information, the receiver may receive an input for selecting the link information from the client terminal, and the controller may execute the linked file stored by the program in response to the received input.

According to an aspect of another exemplary embodiment, there is provided a client terminal for receiving image information from a cloud server and displaying the received image information, the client terminal including: a transmitter which transmits control information to the cloud server; a receiver which receives the image information in response to the transmitted control information and receives an image data file from the cloud server; and a controller which outputs the received image information and the received image data file, wherein the image information is generated by the cloud server based on the transmitted control information, and the image data file is converted from the generated image information and stored in the cloud server, according to a pre-set criterion.

According to an aspect of another exemplary embodiment, there is provided a method of realizing a time shift operation in a cloud server, the method including: receiving control information from a client terminal; generating image information based on the received control information; and converting the generated image information to an image data file and storing the image data file in a storage space for the cloud server.

The method may further include: transmitting the generated image information to the client terminal; receiving screen control information related to the image data file from the client terminal; and transmitting information for changing a display of the image data file to the client terminal in response to the received screen control information.

According to an aspect of another exemplary embodiment, there is provided a method of realizing a time shift operation in a client terminal, the method including: receiving an image data file from a cloud server; and displaying the received image data file on a screen of the client terminal or connected to the client terminal, wherein the image data file is converted from the image information, which is generated by the cloud server based on control information transmitted from the client terminal, and stored in the cloud server.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings, in which like reference numerals refer to like elements throughout.

As used herein, expressions such as "at least one of," when preceding a list of elements, modify the entire list of elements and do not modify the individual elements of the list.

Figure 2:
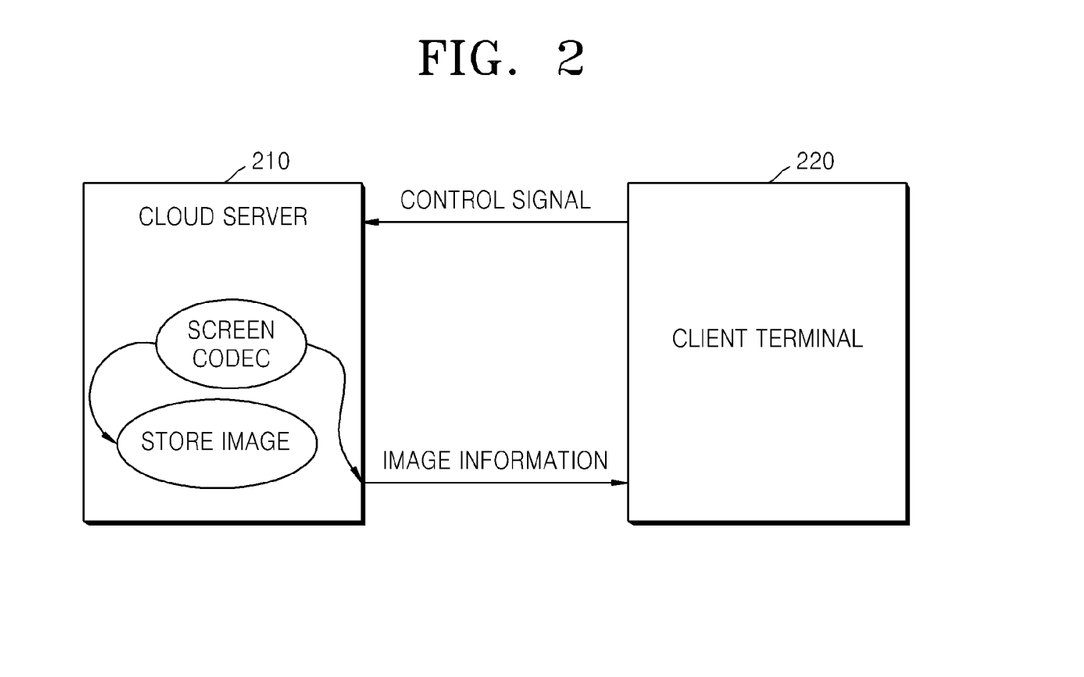
FIG. 2 is a schematic diagram for describing a concept of storing image information in a cloud computing system, according to an exemplary embodiment.

FIG. 2 is a schematic diagram for describing a concept of storing image information in a cloud computing system, according to an exemplary embodiment. Referring to FIG. 2, a client terminal 220 transmits control information (e.g., control signal) to a cloud server 210. The control information may include any type of input, such as a signal or data, transmitted from the client terminal 220 to the cloud server 210.

Upon receiving the control information, the cloud server 210 transmits image information generated based on the control information to the client terminal 220. The image information may basically be the same as or similar to an image displayed on a display device (e.g., a monitor) of a user in a general-purpose computer. For example, when a user of the client terminal 220 edits a simple document or works on the Internet, the cloud server 210 may generate and transmit image information so that the image information is displayed on a screen of the client terminal 220 at the same level as an image generated on a virtual display of the cloud server 210. However, when the user of the client terminal 220 performs a high-specification three-dimensional (3D) task or plays a game, image information transmitted from the cloud server 210 may be a severe load on a network, or processing capability of a screen decoder in the client terminal 220 may not be sufficient to parse the image information. Thus, the cloud server 210 may transmit, to the client terminal 220, image information converted to be suitable for the client terminal 220 by using a screen codec.

In this case, the cloud server 210 separately stores the image information as an image data file in a storage or memory space of the cloud server 210 and allows the client terminal 220 to access the stored image data file so that the user of the client terminal 220 can view a screen with which he or she interacted in the past.

Figure 3:
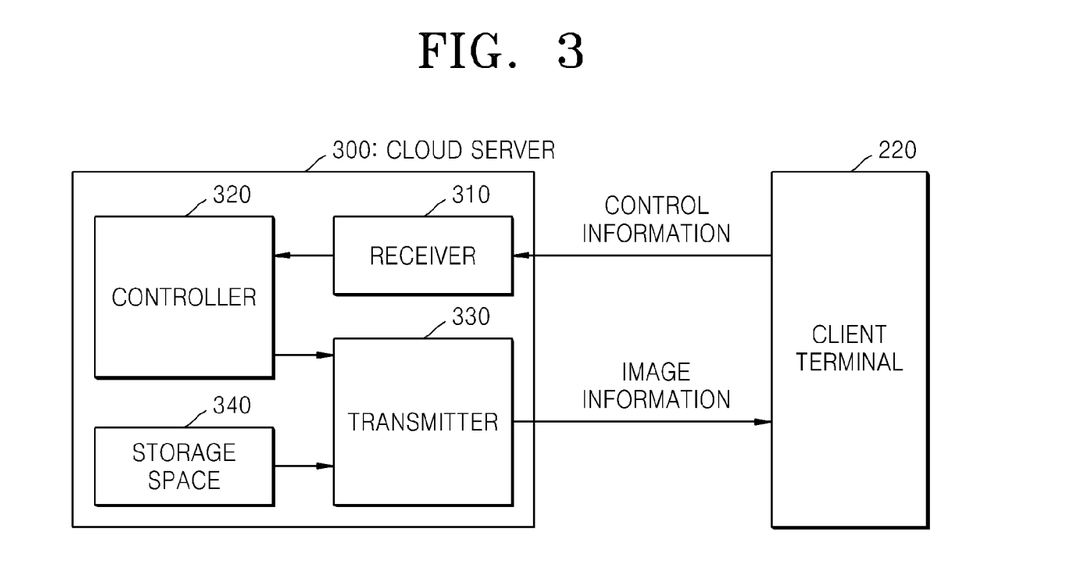
FIG. 3 is a block diagram of a cloud server according to an exemplary embodiment.

FIG. 3 is a block diagram of a cloud server 300 according to an exemplary embodiment. Referring to FIG. 3, the cloud server 300 includes a receiver 310, a controller 320, and a transmitter 330. The cloud server 300 may further include a storage space 340 for storing an image data file converted from image information.

The receiver 310 receives control information from the client terminal 220. In a cloud computing system, a command input by a user using an input device, such as a keyboard, a mouse, or a touchpad, of the client terminal 220 is actually processed by the cloud server 300, and the client terminal 220 may be used as a display or a separate device outputting an image to a display, so all types of user inputs and information based on the user input are transmitted to the cloud server 300. The user input includes not only an input through the input device described above, but also a physical input, such as power ON/OFF of the client terminal 220.

The controller 320 generates image information based on the received control information. The controller may perform various tasks to control the cloud computing system in addition to a task for generating the image information. For example, the controller 320 may include a video module for generating and processing the image information, wherein the video module may include a screen information capturing unit, a screen encoder, etc. In addition, the controller 320 may further include an audio module for processing audio, a network management module, a client account management module, and a session manager and perform their related operations.

A process of generating the image information in the controller 320 may be similar to a process of generating image information displayed on a monitor of a computing device using a central processing unit (CPU) or a graphic processing unit (GPU) in the computing device. However, the image information generated in an environment of the cloud computing system is transmitted to the client terminal 220 instead of a display device of the cloud server 300 and displayed on a screen of the client terminal 220 or connected to the client terminal 220.

The controller 320 may generate image information suitable for the client terminal 220 or a display device of the client terminal 220. The cloud server 300 may collect system information about a graphic processing capability, such as a resolution of the client terminal 220 connected to the cloud server 300, from the client terminal 220 and generate proper image information by determining the resolution according to the collected system information. For example, when a display device included in the client terminal 220 has a resolution of a 16:9 wide monitor, the controller 320 may generate image information so that the generated image information is properly displayed on the 16:9 wide monitor. In addition, even when image quality, which can be processed by the client terminal 220 or in a network, is limited, the controller 320 may generate image information having sufficient image quality so as to not overload the network.

To view an image displayed in the past, the controller 320 may convert the generated image information to an image data file and store the image data file in the storage space 340 of the cloud server 300. The image information may be stored as a video stream or a frame-based image.

The storage space 340 indicates a data storage device, such as a hard disk drive (HDD), a solid state drive (SDD), etc., included in the cloud server 300. The storage space 340 indicates a space for storing image data files converted from image information and does not indicate a temporary storage space, such as a random access memory (RAM), a read only memory (ROM), or a buffer. A time the cloud server 300 preserves image data files may be adjusted according to a capacity of the storage space 340. For example, when it is determined that the capacity of the storage space 340 is not sufficient, the cloud computing system may delete the preserved image data files in an early stored image data file order or according to another criterion.

The transmitter 330 transmits the image information generated based on the control signal to the client terminal 220. In addition, the transmitter 330 transmits, to the client terminal 220, an image data file or image information that is generated from the image data file so as to be displayed on the client terminal 220. The transmitter 330 may be any device that is capable of transmitting data, such as a network card, an antenna, a data port, etc.

Figure 4:
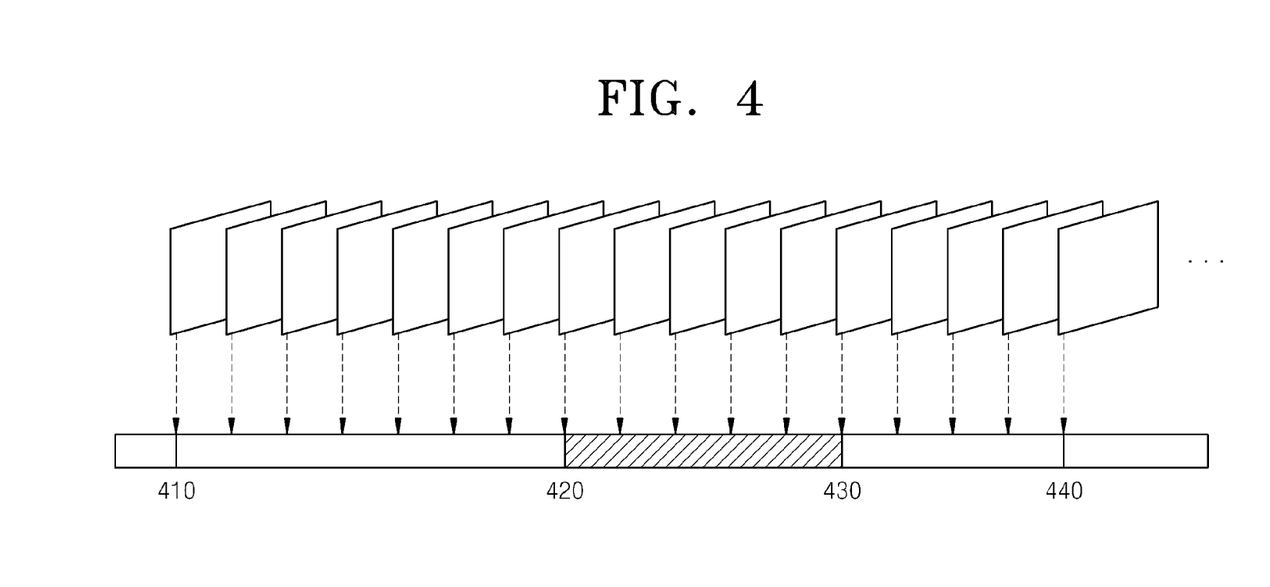
FIG. 4 is a diagram for describing a method of converting image information generated based on a control signal to an image data file in a controller, according to an exemplary embodiment.

FIG. 4 is a diagram for describing a method of converting image information generated based on a control signal to an image data file in the controller 320, according to an exemplary embodiment. The method shown in FIG. 4 may be applied to all of four examples described below. The controller 320 generates a sufficient number of images, e.g., 24 frames per second (fps), 30 fps, 60 fps, or above, so that sequential images are displayed on a screen of the client terminal 220. If the controller 320 does not generate and transmit images having a sufficient number of frames per second, a user of the client terminal 220 may perceive that a screen is flickering or intermittent.

A first example of the method of converting image information to an image data file is that all generated frames are converted to the image data file and stored. The number of frames included in a single unit file may be properly set by the cloud computing system. This method may be equivalent to a screen displayed on the client terminal 220 being recorded in real-time.

A second example of the method is that only image information in which a change is detected from among generated image information, is converted to an image data file. For example, because there are no inputs from a user and no separate processes executed by the cloud server 300 during a specific duration between 420 and 430 in a time line of FIG. 4, no change may occur in the display of the client terminal 220. Since a major objective of a time shift function is to view a task conducted in the past, it may be unnecessary to continuously store a screen with no change. Thus, by storing only image information in which a change is detected, a storage space may be saved, and it may be easy for the user to view a past task. In this case, time information corresponding to each frame may be included in an image data file to be stored.

A third example of the method is that image information is stored for a time desired by a user. That is, when a control signal for directing a storing start of image information is received from the client terminal 220, the controller 320 starts converting image information into an image data file and storing the image data file in the storage space 340 from a start time 420. Thereafter, upon receiving a control signal for directing a storing end of image information, the controller 320 ends this storing task at an end time 430.

A fourth example of the method is that image information is stored while a specific program is being executed. For example, when an image/video editing program, a presentation program used for a conference, or a video play program is executed (at the time 420), image information is stored as an image data file, and when the corresponding program is terminated (at the time 430), this storing task ends. A list of programs for which image information is stored may be set in the cloud server 300 in advance or set arbitrarily by a user input.

The above-described methods of converting generated image information to an image data file based on control information may be combined and used in various ways. In addition, it is understood that one or more other exemplary embodiments are not limited to the above four methods and may be freely modified and used by those of ordinary skill in the art.

In terms of a user using an image data file to view a screen previously viewed in the past, image information may not be stored as an image data file with an original size or an original resolution. The controller 320 may store the image information at a lower resolution (e.g., half or less) than the original size or with degraded image quality in consideration, e.g., of at least one of the efficiency of the storage space 340 and the usage of system resources.

Figure 5A:
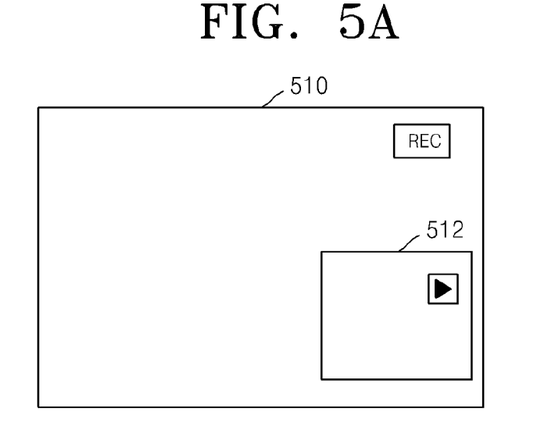
FIGS. 5A to 5E are diagrams for describing various methods of displaying an image data file, which is obtained by storing image information, on a screen of a client terminal, according to an exemplary embodiment.

A stored image data file is transmitted to a client terminal to be displayed on a screen of the client terminal. FIGS. 5A to 5E are diagrams for describing various methods of displaying an image data file, which is obtained by storing image information, on a screen of a client terminal, according to an exemplary embodiment. In the description below, a case where image information generated based on a control signal is displayed on the client terminal is distinguished from a case where an image data file obtained by storing image information is displayed on the client terminal. For example, when the client terminal executes an image data file that is stored in the storage space 340 of the cloud server 300 by using a video play program, such as WINDOWS MEDIA PLAYER, image information generated based on a control signal is displayed on the client terminal. This is shown in FIG. 5A. An image data file is reproduced in an area 512 in which reproduction is performed by a video play program, and this is a portion of image information generated based on a control signal for executing the image data file. That is, if image information of a current time is stored as an image data file (510), when a user views a screen record of the current time later on, the user may view a screen showing a past screen record.

This is distinguished from a case where both image information generated based on a control signal and an image data file obtained by storing image information are transmitted to the client terminal and displayed according to a pre-set criterion or a case where an image data file is separately transmitted to the client terminal and displayed based on an input of a function key for displaying an image data file. These examples are shown in FIGS. 5B to 5E.

Figure 5B:
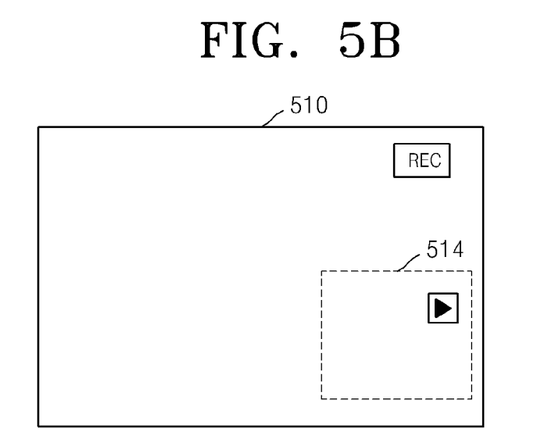

FIG. 5B shows that an image data file is displayed on a screen of a client terminal in a Picture in Picture (PIP) method or an On Screen Display (OSD) method. A screen of a PIP or OSD area 514 is not included in image information generated at this time. That is, a screen 510, which would be displayed without the PIP or OSD method, is not included in the image information generated at this time. In this case, a user may control the image data file by using a predetermined input or function key, e.g., by placing a mouse cursor on the OSD area 514 and scrolling a wheel of the mouse. Of course, this control may also be implemented via the cloud server 300.

Figure 5C:
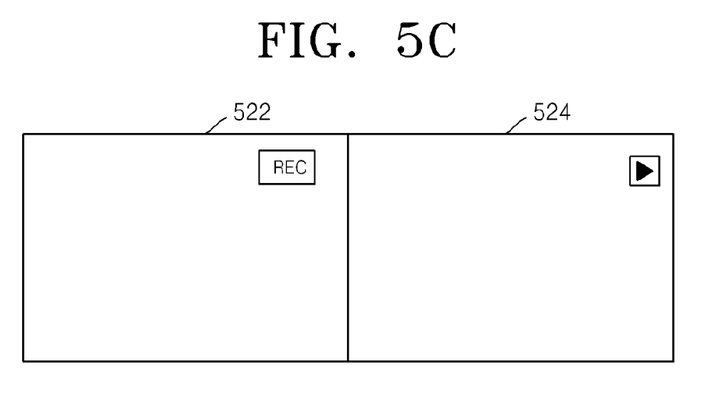

FIG. 5C shows that, when a client terminal has a plurality of screens, image information based on control information is displayed on a first screen 522, and an image data file is displayed on a second screen 524. In this case, the controller 320 of the cloud server 300 generates only a display of the first screen 522 as the image information based on the control information. Since a screen viewed in the past is displayed on the second screen 524, image information for the second screen 524 may not be generated again. Of course, displays of both the first screen 522 and the second screen 524 may be generated as image information.

Figure 5D:
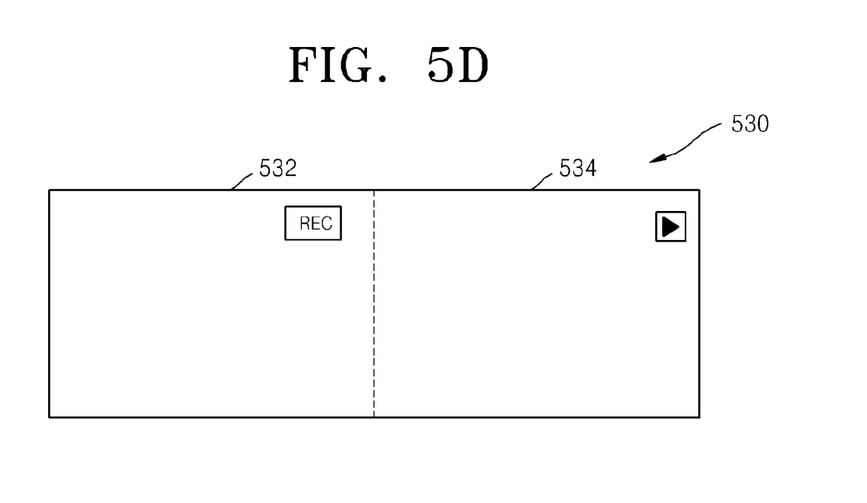

FIG. 5D shows that a client terminal has a single screen 530 divided into a first area 532 and a second area 534, wherein image information based on control information is displayed on the first area 532, and an image data file is displayed on the second area 534. The controller 320 of the cloud server 300 may generate only a display of the first area 532 as image information or generate a display of the entire screen 530 as image information. In addition, a ratio of the first area 532 to the second area 534 may be arbitrarily adjusted.

Figure 5E:
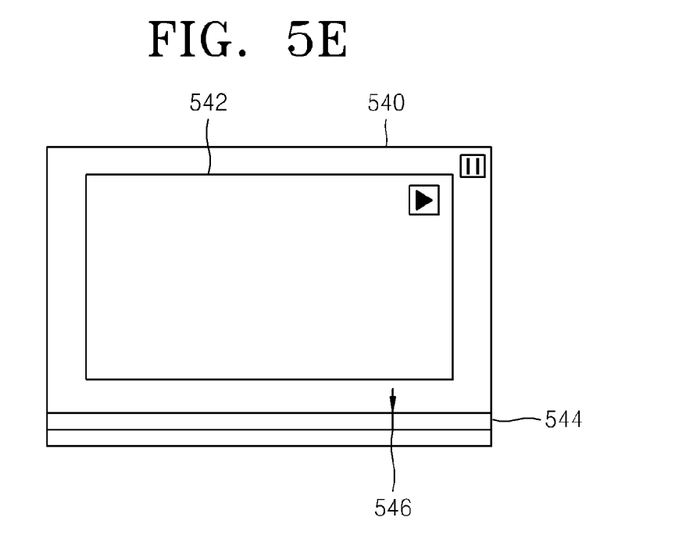

FIG. 5E shows that an image data file is viewed while image information generated based on control information is being displayed. When a pre-defined screen control signal, such as a signal of a function key, is input in a client terminal, an image data file is displayed in an area 542 on a screen 540 of the client terminal, thereby viewing past images using a scroll or playback bar. In this case, the image data file displayed on the screen 540 may be displayed on a full screen or on a screen having a predetermined frame size. Then, a task for storing image information generated based on control information as an image data file in the cloud server 300 may pause from an input time of a screen control signal to a release time of the screen control signal because a necessity to convert a screen showing a past screen to an image data file may not be high.

In the description with reference to FIGS. 5A to 5E, information indicating whether a currently displayed image is recorded as an image data file, whether an image data file is reproduced, and whether recording of an image data file pauses may be included in each screen to, for example, prevent a user from becoming confused.

Figure 6:
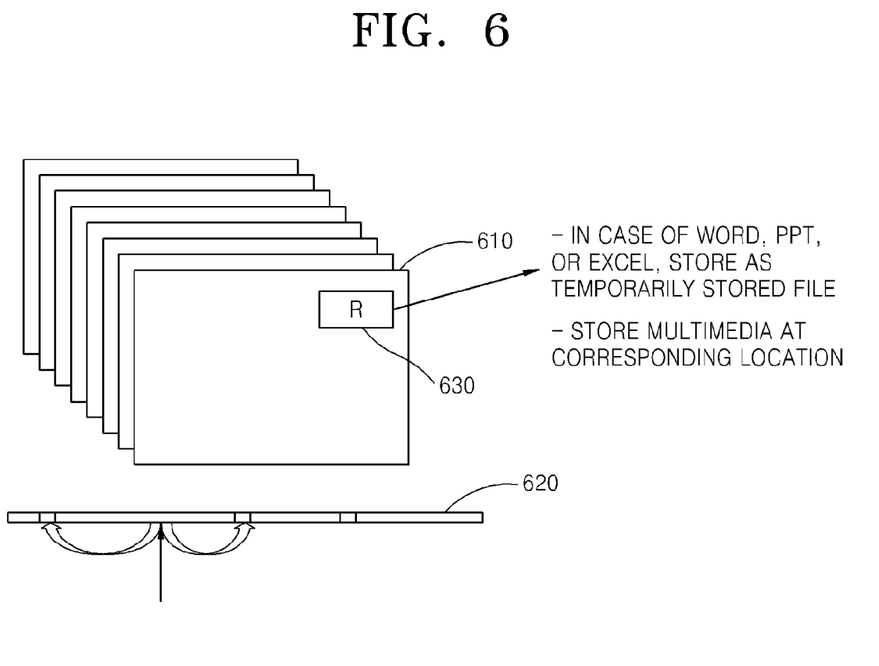
FIG. 6 is a diagram for describing a method of linking and storing image information and a data file of a program, according to an exemplary embodiment.

FIG. 6 is a diagram for describing a method of linking and storing image information and a data file of a program, according to an exemplary embodiment. A user using a cloud computing system may store a file, which is being edited by a program, at any time. In addition to the storing by the user, a temporarily stored file may be generated at any time according to a criterion set by the program. When such an event for storing a data file of a program occurs, the controller 320 of the cloud server 300 may link and store image information and the data file of the program. In addition, information directing the linked data file may be included in an image data file. When the user desires to view a past task based on an image data file, an image 610 of a specific time, which is selected by the user using a scroll or playback bar 620, may include information 630 directing a program data file stored by being linked to the image 610 when the image 610 was stored. When the user selects this link information 630, a client terminal transmits a control signal to the cloud server 300 in response to the selection of the link information 630, and the controller 320 of the cloud server 300 executes a data file of a program directed by the link information 630. By doing so, the user may view not only a screen viewed by the user in the past but also a file stored during the task.

Figure 7:
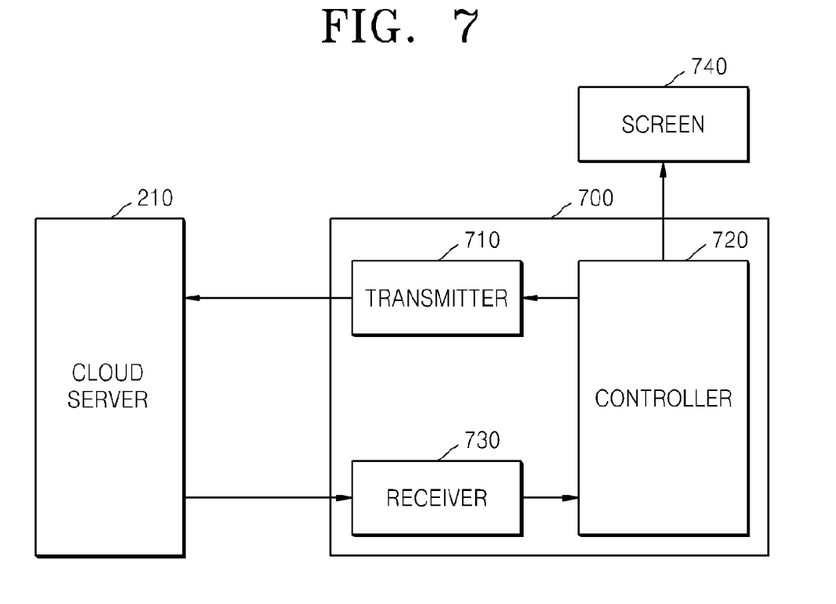
FIG. 7 is a block diagram of a client terminal according to an exemplary embodiment.

FIG. 7 is a block diagram of a client terminal 700 according to an exemplary embodiment. Hereinafter, descriptions that are redundant with the above descriptions are omitted. The client terminal 700 includes a transmitter 710 for transmitting control information to the cloud server 300, a receiver 730 for receiving image information and an image data file, and a controller 720 for displaying the image information and the image data file on a screen 740 of the client terminal 700. In addition, the client terminal 700 may also perform other general functions for implementing a cloud computing system.

The screen 740 of the client terminal 700 may be included in the client terminal 700 or may be an external screen or a projector screen of, for example, a conference room, which is connected to the client terminal 700 in a wired/wireless manner.

The client terminal 700 may not include a data storage device, such as a hard disk, or the client terminal 700 may include a data storage device.

The client terminal 700 receives image information from the cloud server 210 and displays the received image information on the screen 740 of the client terminal 700. A user performs various tasks based on an image displayed on the screen 740 of the client terminal 700. In the cloud computing system, the user of the client terminal 700 may not recognize that a program is processed by the cloud server 210. In other words, the user of the client terminal 700 may perceive that the client terminal 700 processes an input and displays its processing result instead of recognizing that the client terminal 700 receives the processing result of the input as image information from the cloud server 210 and displays the received image information.

When the user of the client terminal 700 desires to view a screen viewed by the user in the past, the user may execute an image data file by accessing a storage device (existing in the cloud server 210 or connected thereto), or may receive an image data file from the cloud server 210 and separately display the received image data file. The former may be performed in the method described with reference to FIG. 5A, and the latter may be performed in the methods described with reference to FIGS. 5B to 5E.

When the user desires to view the contents viewed in the past based on an image data file using the client terminal 700, if the image data file includes link information about a data file of another program, the user may select the link information. The data file of the program that is directed by the link information is executed by the controller 320 of the cloud server 210, and the receiver 730 of the client terminal 700 receives image information obtained by executing the data file of the program to display the image information on the screen 740.

Figure 8:
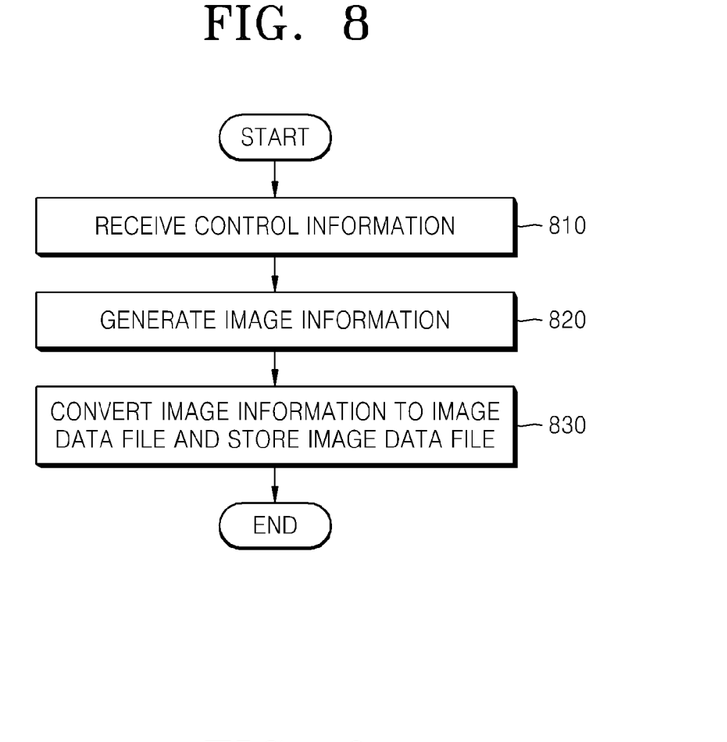
FIG. 8 is a flowchart illustrating a method of storing image information and an image data file in a cloud server, according to an exemplary embodiment.

FIG. 8 is a flowchart illustrating a method of storing image information and an image data file in a cloud server, according to an exemplary embodiment. Descriptions that are redundant with the descriptions given above are omitted hereinafter. In operation 810, the cloud server receives control information from a client terminal. In operation 820, the cloud server generates image information based on the received control information. In operation 830, the cloud server converts the generated image information to an image data file and stores the image data file in a storage space of the cloud server, according to a predetermined criterion. The image information may be used to display a current screen of the client terminal, and the image data file may be used to view a screen viewed on the client terminal in the past.

Figure 9:
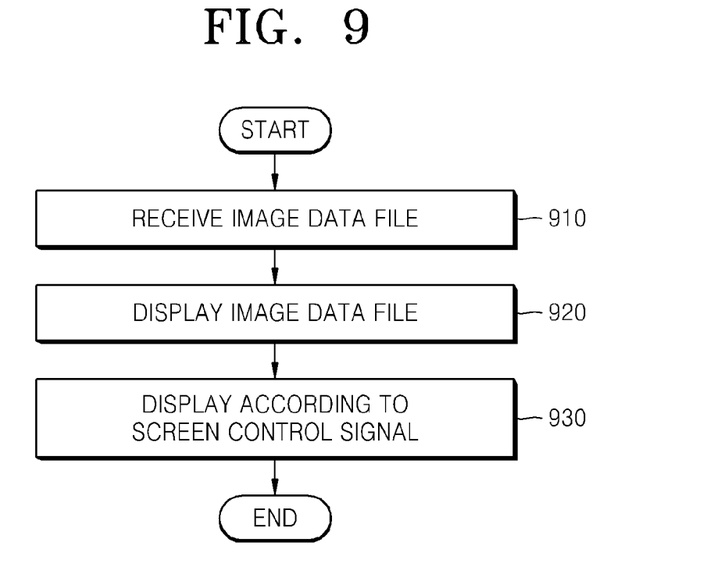
FIG. 9 is a flowchart illustrating a method of viewing image information viewed in the past in a client terminal, according to an exemplary embodiment.

FIG. 9 is a flowchart illustrating a method of viewing image information viewed in the past in a client terminal, according to an exemplary embodiment. Descriptions that are redundant with the descriptions given above are omitted hereinafter. In operation 910, the client terminal receives an image data file from a cloud server. The image data file is a file obtained by storing image information generated by the cloud server according to a predetermined criterion based on a control signal transmitted from the client terminal before a current time. In operation 920, the client terminal displays the received image data file on a screen. In operation 930, the client terminal receives a screen control signal input by a user who desires to view a screen viewed in the past. The screen control signal may be transmitted to the cloud server so that a display of the client terminal is changed under control of the cloud server. If the client terminal includes a predetermined storage device, receives and stores an image data file, and displays the stored image data file on a screen of the client terminal by executing the stored image data file, the client terminal may independently control the image data file without transmitting a screen control signal to the cloud server.

According to exemplary embodiments, a user of a client terminal may view a screen viewed in the past in a cloud computing system. In addition, a screen viewed in the past may be displayed together with a screen being viewed in the present, thereby reflecting the contents of a past task in a current task.

In addition, a screen viewed in the past may be linked to a program data file of a past task, thereby allowing the contents of a task of a specific time to be easily perceived and accessed.

In addition, used contents and history of the cloud computing system may be recorded and preserved, whereas a past record cannot be viewed in a related art cloud computing system since an image generated by a server is not preserved in the server once the image is transmitted to a client terminal.

The block diagrams disclosed above may be analyzed by those of ordinary skill in the art whereby a circuit for implementing the principles of exemplary embodiments may be conceptually expressed. Similarly, it may be understood by those of ordinary skill in the art that arbitrary flowcharts, flow diagrams, state transition diagrams, and pseudo codes may be substantially represented in a computer-readable medium and indicate various processes that may be executed in a computer or processor regardless of whether the computer or processor is explicitly shown. Thus, exemplary embodiments may be written as computer programs and may be implemented in general-use digital computers that execute the programs using a computer-readable recording medium. Examples of the computer-readable recording medium include storage media such as magnetic storage media (e.g., ROM, floppy disks, hard disks, etc.) and optical recording media (e.g., CD-ROMs, or DVDs).

Functions of various elements shown in the drawings may be provided by using not only software-executable hardware in association with appropriate software but also exclusive hardware. When the functions are provided by a processor, the functions may be provided by a single exclusive processor, a single shared processor, or a plurality of individual processors, some of which can be shared. In addition, the explicit use of the term "processor" or "controller" should not be analyzed as exclusively indicating software-executable hardware and may implicitly include digital signal processor (DSP) hardware, a read only memory (ROM) for storing software, a random access memory (RAM), and a non-volatile storage device without any limitation.

In the claims of the specification, an element expressed as a means for performing a specific function includes an arbitrary method for performing the specific function, and this element may include an arbitrary format of software including firmware, microcode, and so forth, which may be combined with a set of circuit elements for performing the specific function or a circuit suitable to execute software for performing the specific function.

In the specification, 'an exemplary embodiment' and various modifications of this expression indicate that a specific feature, structure, and characteristic related to the exemplary embodiment are included in at least one exemplary embodiment of the principles of the present inventive concept. Thus, the expression 'in an exemplary embodiment' and other arbitrary modifications disclosed in the entire specification do not necessarily indicate the same exemplary embodiment.

In the specification, in a case of 'at least one of A and B', the expression 'at least one of' is used to include the selection of the first option A, the selection of the second option B, or the selection of the both options A and B. In addition, a case of 'at least one of A, B, and C' may include the selection of the first option A, the selection of the second option B, the selection of the third option C, the selection of the first and second options A and B, the selection of the second and third options B and C, or the selection of the three options A, B, and C. Even when a higher number of options are listed, this may be clearly extended and analyzed by those of ordinary skill in the art.

Exemplary embodiments have been particularly shown and described above with reference to the accompanying drawings. All exemplary embodiments and conditional examples disclosed throughout the specification are described to help those of ordinary skill in the art understand the principle and concept of the present inventive concept, and it will be understood by those of ordinary skill in the art that various changes in form and details may be made therein without departing from the spirit and scope of the present inventive concept as defined by the following claims. Exemplary embodiments should be considered in a descriptive sense only and not for purposes of limitation. Therefore, the scope of the present inventive concept is defined not by the detailed description of exemplary embodiments, but by the appended claims, and all differences within the scope will be construed as being included in the present inventive concept.

What is claimed is:

1. A cloud server for providing image information to a client terminal, the cloud server comprising:
   a receiver which receives control information from the client terminal;
   a controller which generates image information based on the received control information; and
   a transmitter which transmits, in response to the received control information, the generated image information to the client terminal for display on a screen of the client terminal or connected to the client terminal,
   wherein the generated image information is converted to an image data file and the image data file is stored in a storage space for the cloud server.

2. The cloud server of claim 1, wherein, in response to detecting a change in image information from among the generated image information, the controller converts the image information in which the change is detected into the image data file.

3. The cloud server of claim 1, wherein:
   the receiver receives, from the client terminal, a first input for instructing a start to storing the generated image information and receives, from the client terminal, a second input for instructing an end to the storing of the generated image information; and
   the controller stores the generated image information as the image data file based on the received first input and the received second input.

4. The cloud server of claim 1, wherein the image data file is generated by changing at least one of a resolution, a size, and an image quality of an image corresponding to the image information.

5. The cloud server of claim 1, wherein the transmitter transmits the stored image data file to the client terminal so that the transmitted image data file is displayed on the screen of the client terminal or connected to the client terminal.

6. The cloud server of claim 5, wherein the transmitted image data file is displayed on the screen of the client terminal or connected to the client terminal, on which the transmitted image information is displayed, by using a Picture in Picture (PIP) method or an On Screen Display (OSD) method.

7. The cloud server of claim 5, wherein the transmitter transmits the generated image information and the stored image data file to the client terminal so that the transmitted image information is displayed on a first screen of the client terminal or connected to the client terminal while the transmitted image data file is displayed on a second screen of the client terminal or connected to the client terminal.

8. The cloud server of claim 5, wherein:
   the receiver receives screen control information related to the transmitted image data file from the client terminal; and
   the controller changes a display of the transmitted image data file in response to the received screen control information.

9. The cloud server of claim 8, wherein the controller pauses a task for storing the generated image information as the image data file in response to the screen control information being received.

10. The cloud server of claim 1, wherein, when an editing file is stored by a program executed by the cloud server, the controller links the image information and the stored file and stores the linked image information as the image data file.

11. The cloud server of claim 10, wherein:
   the stored image data file includes link information;
   the receiver receives an input for selecting the link information from the client terminal; and
   the controller executes the linked file stored by the program in response to the received input.

12. A client terminal for receiving image information from a cloud server and displaying the received image information, the client terminal comprising:
   a transmitter which transmits control information to the cloud server;
   a receiver which receives the image information from the cloud server in response to the transmitted control information and receives an image data file from the cloud server; and
   a controller which outputs the received image information and the received image data file,
   wherein the image information is generated by the cloud server based on the transmitted control information, and the image data file is converted from the generated image information and stored in the cloud server.

13. The client terminal of claim 12, wherein:
   the client terminal includes or is connected to a plurality of screens; and
   the received image information is displayed on a first screen of the plurality of screens, and the received image data file is displayed on a second screen of the plurality of screens.

14. The client terminal of claim 12, wherein:
   the transmitter transmits screen control information related to the image data file to the cloud server; and
   the received image data file is displayed based on the transmitted screen control information.

15. The client terminal of claim 12, wherein, when the image data file includes link information for another file, in response to an input for selecting the link information being received, execution of the file directed by the link information is displayed.

16. The client terminal of claim 12, wherein the output image information corresponds to a real-time display of a processing result, and the output image data file corresponds to a time-shifted display of the processing result.

17. A method of realizing a time shift operation in a cloud server, the method comprising:
   receiving control information from a client terminal;
   generating image information based on the received control information;
   transmitting the generated image information to the client terminal in response to the received control information
   converting the generated image information to an image data file; and
   storing the image data file in a storage space for the cloud server.

18. The method of claim 17, wherein the converting and the storing are according to a pre-set criterion.

19. The method of claim 17, further comprising:
   transmitting the stored image data file to the client terminal;

receiving screen control information related to the transmitted image data file from the client terminal; and transmitting information for changing a display of the image data file to the client terminal in response to the received screen control information.

20. A method of realizing a time shift operation in a client terminal, the method comprising:

transmitting control information to a cloud server;

receiving, in response to the transmitted control information, image information generated based on the transmitted control information;

displaying the received image information on a screen of the client terminal or connected to the client terminal;

receiving an image data file from the cloud server; and displaying the received image data file on the screen of the client terminal or connected to the client terminal, wherein the image data file is converted from the image information and stored in the cloud server.

21. The method of claim 20, further comprising:

transmitting screen control information related to the image data file to the cloud server, wherein the received image data file is displayed based on the transmitted screen control information.

\* \* \* \* \*